Oct. 7, 1952  B. F. REDDING  2,613,046
FISHING REEL
Filed June 30, 1950  2 SHEETS—SHEET 1
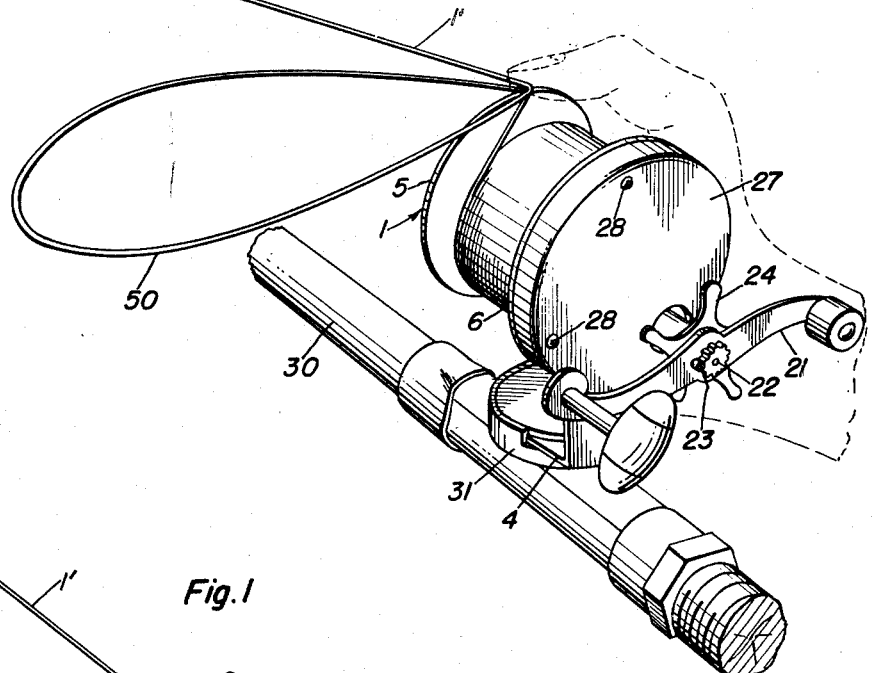
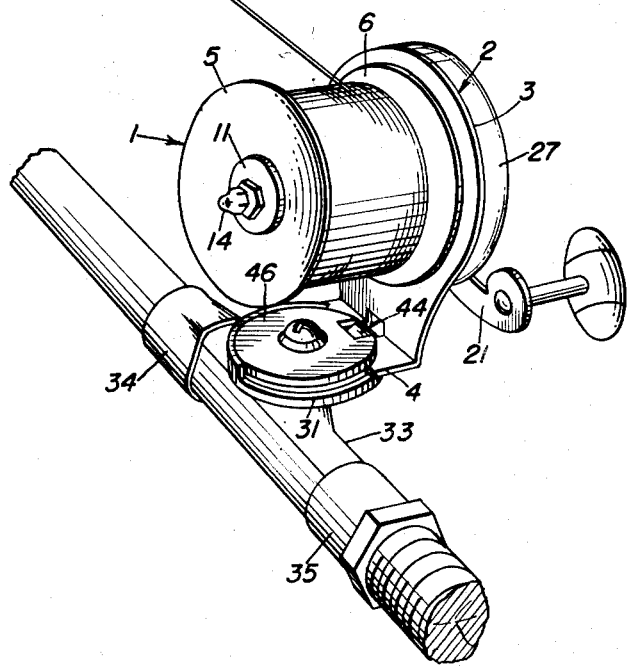
Benjiman F. Redding
INVENTOR.

Oct. 7, 1952          B. F. REDDING              2,613,046
                      FISHING REEL
Filed June 30, 1950                           2 SHEETS—SHEET 2
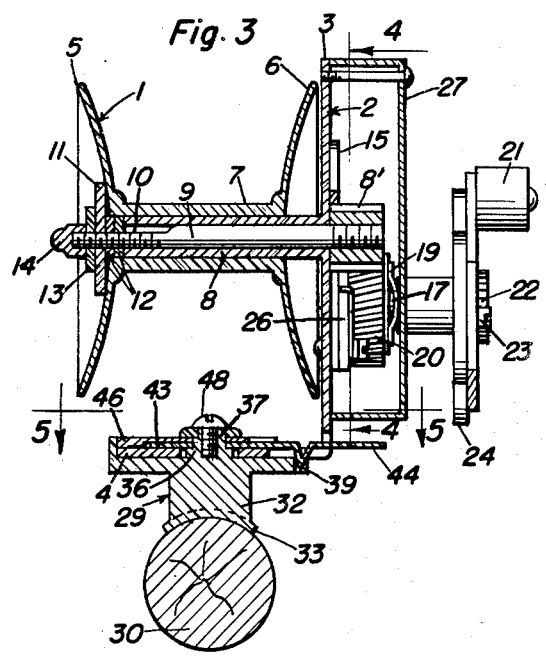
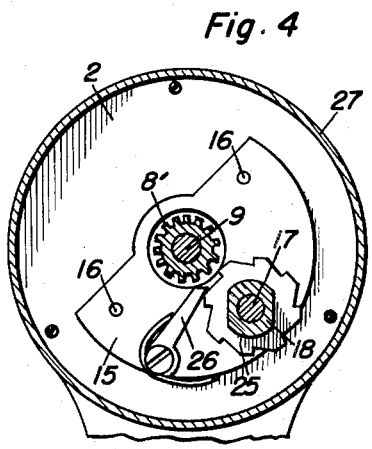
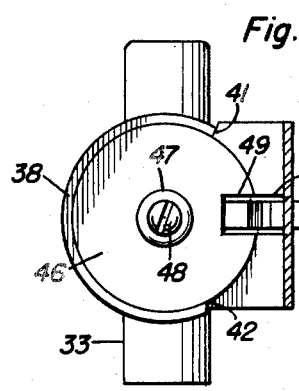
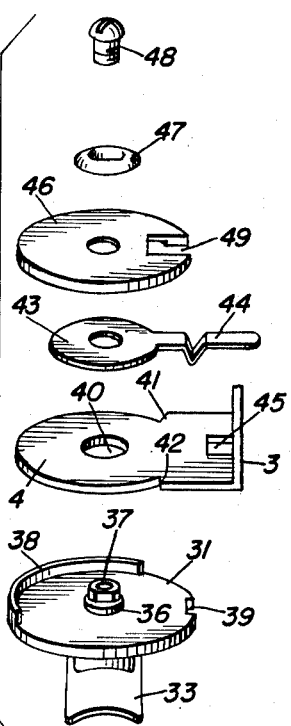
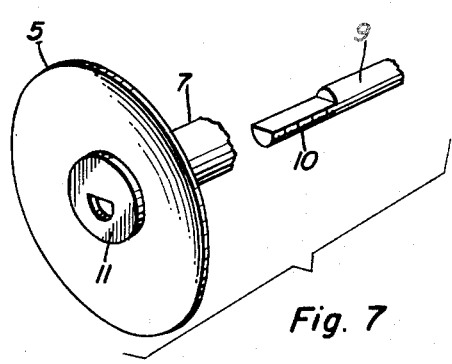
Benjiman F. Redding
INVENTOR.

UNITED STATES PATENT OFFICE 2,613,046

FISHING REEL

Benjiman F. Redding, Monterey Park, Calif.

Application June 30, 1950, Serial No. 171,310

2 Claims. (Cl. 242—84.5)

My invention relates to improvements in fishing reels and particularly to casting reels for fishing poles.

The primary object of my invention is to provide a casting reel which will eliminate backlash in casting, without the use of a backlash brake and particularly when casting long distances.

Another object is to provide a reel of the character and for the purposes specified which is simple in construction, substantially fool-proof, and economical to manufacture.

Other important objects, within the purview of my invention, together with the precise nature of my improvements will be readily understood when the succeeding description and claims are read with reference to the drawings accompanying and forming part of this specification.

In said drawings:

Figure 1 is a fragmentary view in perspective of my improved reel mounted on a fishing pole with the spool swung into normal position crosswise of the pole;

Figure 2 is a similar view with the spool swung into parallel relation with the pole for casting according to my invention;

Figure 3 is a view in vertical transverse section;

Figure 4 is a fragmentary view in vertical section taken on the line 4—4 of Figure 3;

Figure 5 is a view in horizontal section taken on the line 5—5 of Figure 3;

Figure 6 is a composite view of the parts of the bracket plate mounting; and,

Figure 7 is a composite view in perspective of the spool drive shaft and the end disk of the spool keyed to said shaft.

Referring to the drawings by numerals, the spool 1 of my improved reel, and the spool operating mechanism, presently described, are carried by a right angled bracket plate 2 having an upstanding disc-like side 3 and a relatively smaller disc-like lateral supporting base flange 4. The spool 1 is of the usual type with concavo-convex end discs, or flanges 5, 6 and a hub 7.

The spool 1 is rotatably mounted, by means of the hub 7, on a hollow shaft 8 integral with the side 3 of the bracket plate 2 and extending from the inner face of said side 3 to support said spool 1 directly over the base flange 4 with the end disc 5 completely exposed.

A spool drive shaft 9 extends through and is journaled in the hollow shaft 8 with a flattened outer end 10. A washer 11 welded onto the end disc 5 and fitted over said flattened end 10 keys said end disc 5 to said shaft 9. Washers 12 on the flattened end 10 of shaft 9, between the end disc 5 and the outer end of the hollow shaft 8, space the end disc 6 clear of the side 3 of bracket plate 2 for free rotation. Lock nuts 13, 14 on said end 10 of the spool drive shaft retain the spool 1 on hollow shaft 8.

The operating mechanism for the spool 1 comprises a gear pinion 8' fast on the spool drive shaft 9 opposite the outer face of the side 3 of the bracket plate 2 and which extends through an apertured segment plate 15 secured by screws 16 to said side 3 and from which projects a fixed stub shaft 17 on which is journaled the usual flat sided handle operated bushing 18 for operating the usual "star drag" friction clutch 19 for driving a gear wheel 20 surrounding said bushing and meshing with the gear pinion 8'.

The usual handle 21 is carried on the outer end of the bushing 18 and retained thereon by a screw 22 in said end of the bushing 18 and a locking screw 23 on said handle 21 for the screw 22. The numeral 24 designates the usual star wheel on the bushing 18 behind the handle 21 for engaging and releasing the friction clutch 19 in a manner requiring no detailed description since "star drag" clutches are well known and understood in the art. A ratchet reel 25 on the bushing 18 is engaged by a spring pressed pawl 26 on the segment plate 15 so that reverse rotation of the bushing 18 and of the handle 21, is prevented as is usual. The conventional apertured cover cap 27 for the gear pinion 8' and gear wheel 20, also the friction clutch 19, is attached to the side 3 of the bracket plate 2 by screws 28.

As will now be understood, by releasing the friction clutch 19, by operation of the star wheel 24, the gear wheel 20 and gear pinion 8' are rendered freely rotatable to permit free rotation of the spool 1 forwardly for unwinding the line 1'.

The bracket plate 2 is rotatably attached to a mounting 29 adapted to be attached to the pole 30 so that said bracket plate is swingable about an axis diametrical to said pole, for a purpose presently seen. The mounting 29 comprises a circular plate 31 surmounting an axial post 32 rising from the usual grooved bar 33 fitting the pole 30 for attachment at its ends to said pole by the usual attaching members 34, 35.

The base plate 31 is provided with an axial upstanding stud 36 having a flat sided upper end 37, an arcuate upstanding edge flange 38 on top of said plate, and a side edge notch 39 in said plate, all for a purpose presently apparent. The base flange 4 of the bracket plate 2 is disposed on the base plate 31 and is apertured, as at 40, to fit over the stud 36 and for rotation around said stud on the base plate 31 inside the flange 38. A pair of stop shoulders 41, 42 on the base flange 4, for engagement with opposite ends of the flange 38, limits rotation of said base flange 4 in opposite directions so that the bracket plate 2 may be rotated in one direction to swing the spool 1 into normal position crosswise of the rod 30, as shown in Figure 1, and said bracket plate 2 may be rotated in the opposite direction to swing the spool 1 into parallel relation with the rod 30 with the end disc 5 facing forwardly of said rod, as shown in Figure 2.

Latch means is provided for releasably retaining the bracket plate 2 stationary in the described normal position of the spool 1. The latch means comprises a spring metal, axially apertured disc 43 imposed on the base flange 4 and fitted around the stud 36 to rotate with said flange 4 and bracket plate 2. A radial spring latch tongue 44 on the latch disc 43 extends downwardly through a slot 45 in the bracket plate 2 to ride the edge of the base plate 31 and snap into the notch 39 when the bracket plate 2 is rotated to swing the spool 1 into normal position. The latch tongue 44 extends outwardly of the slot 45 and outwardly of said bracket plate 2 for manual flexing upwardly out of the notch 39 to unlatch and release the bracket plate 2 for rotation manually. A recessed annular cap disc 46 fits on the stud 36 and over the disc 43 to cover said disc 43 and is rotatable about said stud. A washer 47 fitted on to the reduced end 37 of the stud 36, and a screw 48 threaded in said stud 36 secured said cap disc 46 against the base flange 4 for rotation with said base flange. An edge slot 49 in the cap disc 46 accommodates the latch tongue 47 and permits upward flexing of said tongue and said tongue by being disposed in the slot 49 rotates the cap disc 46 with the spring metal disc 43.

Referring now to the use and operation of the described reel, with the bracket plate 2 rotated to swing the spool 1 into its normal position, as shown in Figure 1, the reel may be used in the usual manner under control of the "star drag." However, by unlatching the bracket plate 2 in the manner described and rotating said plate to swing the spool 1 parallel to the pole 30 as shown in Figure 2, said reel may be used for casting when freed by release of the "star drag" as follows: A loop 50 of slack is formed in the line 1' and held closed by the thumb of the right hand pressing the looped line against the top of the end disc 5 facing forwardly of the pole 30. The cast is then made and when the arc of the cast is completed, the weight of the bait, not shown, will pull the line from under the thumb and take up the slack in the loop 50, after which the pull of the line will cause it to unwind off the spool 1 while sliding forwardly frictionally over and around the edge of said end disc 5 to frictionally brake the spool 1 against over rotation and thereby prevent backlash in the cast. When the line stops unwinding off the spool 1, the bracket plate 2 may be rotated to swing the spool 1 back into normal position for retrieving the line.

The foregoing will, it is believed, suffice to impart a clear understanding of my invention, without further explanation.

Manifestly the invention, as described, is susceptible of modification, without departing from the inventive concept, and right is herein reserved to such modifications as fall within the scope of the appended claims.

Having described the invention, what is claimed as new is:

1. A casting reel for mounting on a fishing pole comprising a bracket plate having a base flange joined thereto at a right angle with respect to the plane of the plate, said base flange being provided with an aperture at its juncture with said plate, a reel mounted on said plate to extend over said flange, a circular base plate attachable to said pole and provided with an arcuate edge flange at one side thereof and an edge notch opposite said arcuate flange, a pivot member securing said base flange on said base plate for rotation in opposite directions to correspondingly rotate said bracket plate, said base flange engaging opposite ends of said arcuate flange to limit rotation of said base flange and bracket plate in opposite directions, and a resilient latch tongue for snap action engagement with said notch to latch said base flange and bracket plate to said base plate in one limit of rotation of said bracket plate, said tongue overlying said base flange with one end rotatably mounted on said pivot and its other end extending outwardly through said aperture for rotation of the tongue with said base flange and bracket plate into and out of registration with said notch and for manipulation at said other end thereof to disengage said tongue from said notch.

2. A casting reel according to claim 1 including a cap disk on said pivot retaining said tongue on the pivot.

BENJIMAN F. REDDING.

REFERENCES CITED

The following references are of record in the file of this patent:

UNITED STATES PATENTS

| Number | Name | Date |
|---|---|---|
| 1,114,084 | Wells | Oct. 20, 1914 |
| 1,621,003 | Dodd | Mar. 15, 1927 |
| 2,120,190 | Rickards et al. | June 7, 1938 |
| 2,327,469 | Teitsma | Aug. 24, 1943 |
| 2,439,298 | Horan | Apr. 6, 1948 |
| 2,535,746 | Mitchell | Dec. 26, 1950 |